United States Patent [19]
Basin et al.

[11] Patent Number: 5,431,727
[45] Date of Patent: Jul. 11, 1995

[54] BITUMEN BASED MIXTURE FOR COATING SURFACES

[75] Inventors: Gerard Basin, Clermont; Patrick Le Breton, Liancourt, both of France

[73] Assignee: Isover Saint-Gobain, Aubervilliers, France

[21] Appl. No.: 223,673

[22] Filed: Apr. 16, 1994

Related U.S. Application Data

[62] Division of Ser. No. 987,704, Dec. 9, 1992, Pat. No. 5,395,439, which is a division of Ser. No. 695,908, May 6, 1991, Pat. No. 5,224,991.

[30] Foreign Application Priority Data

May 4, 1990 [FR] France ............................ 90 05653

[51] Int. Cl.⁶ .......................................... C09D 195/00
[52] U.S. Cl. .................................................. 106/282
[58] Field of Search ........................................ 106/282

[56] References Cited

U.S. PATENT DOCUMENTS 5,028,266  7/1991  Rettenmaier ............... 106/282
5,224,991  7/1993  Basin et al. .................. 106/282

Primary Examiner—David Brunsman
Attorney, Agent, or Firm—Oblon, Spivak, McClelland, Maier, & Neustadt

[57] ABSTRACT

A bituminous mixture, comprising from 0.5 to 20% by weight mineral wool in admixture with bitumen, the fibers of said mineral wool prior to any chemical or mechanical treatment, being equal to at most 7 per 5 grams, and said fibers being treated with a non-ionic finish.

5 Claims, 2 Drawing Sheets

BITUMEN BASED MIXTURE FOR COATING SURFACES

This is a division of application Ser. No. 07/987,704, filed Dec. 9, 1992, now U.S. Pat. No. 5,395,439, which is a division of Ser. No. 07/695,908 filed on May 6, 1991, now U.S. Pat. No. 5,224,991.

BACKGROUND OF THE INVENTION

1. Field of the Invention

The present invention relates to a technique for coating surfaces with bitumen based mixtures, particularly for road surfaces and in particular mixtures for coating gravel.

2. Description of the Background

The bitumens used for surface coating to render them water-tight as in the case of terraces or on surfaces on which vehicles run, i.e., particularly roadways, when it is necessary to provide a road surface with a water impermeable layer by using a pervious bitumen bound stone, are almost never used in the pure state. Indeed, their high and low temperature performance is inadequate and, by themselves, they provide surfaces which are fragile, which break down under frost conditions and which, in contrast, become soft when exposed to heat. In order to improve the behavior of the bitumens and above all the coating materials and in order thus to widen the range of temperatures in which they can be used, various substances are added to the bitumen, from the most banal such as crushed powdered lime, to the most sophisticated such as styrene-butadiene-styrene based macromolecules. Inter alia, a well-known alternative is to add various quantities of fibrous materials such as asbestos, rock fibers or glass fibers to bitumen. These additives widen the range of temperatures over which the bituminous mixtures may be used. However, the use of such mixtures for the production of drainage coatings in which one seeks to limit crushing under load at high temperature remains inadequate, i.e., only uses under low loading and/or at limited temperature are possible. Under a heavy loading or under considerable heat, the bitumen flows and the interstices between the gravel become obstructed, and then drainage is no longer feasible through the surfacing of the roadway.

Specific disclosures of the incorporation of mineral fibers into bitumen, include for example, Swedish Patent Se 211 163, which discloses the use of a filler, in bitumen, which is mineral fibers having a mean diameter of between 5 and 10 $\mu$m with lengths of between 0.1 and 5 mm. By contrast, more recently, European Patents EP 55 233 and EP 58 290 have disclosed the use of fibers having a mean diameter of 1 to 5 $\mu$m, which are treated with a cationic wetting agent under particular mixing conditions.

A need continues to exist for a bitumen based mixture of improved properties for coating surfaces.

SUMMARY OF THE INVENTION

Accordingly, one object of the present invention is to provide a bituminous mixture which may be combined with gravel for use as a self-draining surfacing material under any circumstances.

Another object of the invention is to widen upwardly the temperature range in which the bituminous mixture may be used such that the mechanical behavior at elevated temperature of the bitumen is improved.

Briefly, these objects and other objects of the present invention as hereinafter will become more readily apparent can be attained by a bituminous mixture comprising from 0.5 to 20% by weight mineral wool in admixture with bitumen and having a micronaire before any chemical or mechanical treatment of at least 7 per 5 grams, the fibers having been treated with a non-ionic finish.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
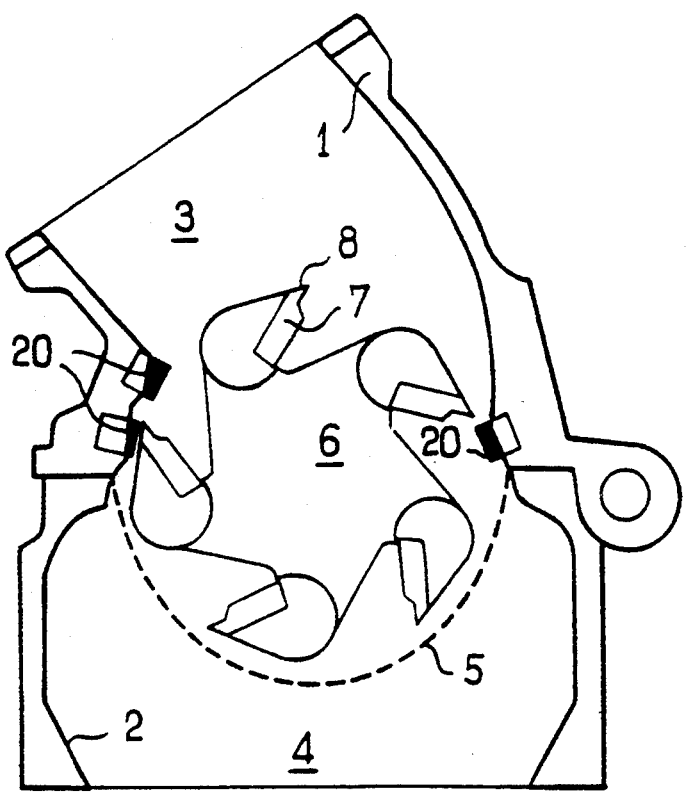
FIG. 1 is a diagrammatic view of a machine which prepares the fibrous nodules of the present invention.

An aspect of the invention is a method of producing a bitumen based mixture with mineral wool in which a mineral wool is first produced and then the virgin fibers are treated with the finish described above. Thereafter, the fibers are dried and nodules are formed by passing the fibers through a sheet with holes of an average size between 3 and 30 mm. Finally, the mineral fibers are mixed with the bitumen.

In an alternative method, the mean size of the holes in the plate is between 6 and 15 mm and is preferably 10 mm in the case of a micronaire of 6 per 5 grams or 8 mm in the case of a micronaire of 4 per 5 grams.

The invention likewise provides for a method of manufacturing a mixture of gravel for producing highway surfaces, compact or self-draining. The method also applies to the production of mixtures intended for the waterproof surfacing of roofs or walls such as of a dam.

Inter alia, the technique of the invention makes it possible to produce bituminous mixtures which are entirely suited to the technique of draining coatings. In particular, the stability under temperature is markedly better. It is thus that the so-called "ball and ring" test is improved by a value which may be as much as 18° C. Similarly, the pouring test on the DANIEL gauge is improved by 40%.

Thus, the invention makes it possible substantially to improve the performance of bituminous mixtures containing a given proportion of fibers or, if the conditions of use allow it, it is possible to retain the performance levels achieved with conventional fibers but with a far smaller proportion of fibers, for example 3% instead of 5%, which represents a considerable saving of fiber.

For the production of fibers which are to be added to bitumen, fibers are first produced. Fibers of desired diameter and length can be prepared from a molten material such as a blast furnace slag or a glass composition, and then optionally sizing the fibers with an organic compound in solution. The fibers can then be dried and then polymerization occurs. The fibrous mat is adapted to the function of being an adjuvant to bitumen and then is finally packaged. At the moment the fibers are combined with the bitumen, they have a length of less than 500 μm.

The chemical composition of the mineral fibers, like their method of manufacture, does not in itself play any determining role in their adaptation to the function of bitumen adjuvant. For example, the method described in EP patent 59 512 for the production of rock fibers and that of EP patent 91 866 for the production of glass fibers makes it possible to achieve the desired result. The only factors which have been shown to be important are the fineness and length of the fibers produced.

The specialists in the production of mineral fibers are well aware of the difficulties which have to be met in industrial production in terms of diameter and length of the fibers. Obviously, it is possible to take samples from the mat under production and to observe under a microscope the fibers which are collected. It is possible to note the diameter and length of each of the fibers observed in the optical field and it is possible to calculate the arithmetical means. Thus, a mean diameter and a mean length are ascertained. If numerous measurements of this type are carried out and if one assumes that the taking of samples is not destructive, particularly in terms of length, then one can obtain figures which are representative of the fiber mat. But these two factors of diameter and length are not independent. The more drawn out fibers will be the thinner fibers and the length and diameter will therefore seem a priori to be parameters which vary in opposite directions, but on the other hand, the thinnest fibers are also the most fragile and they may break during the first phases of production and are likely to become shorter than the coarsest fibers. It happens that an important parameter for the reinforcement of a bitumen is the specific surface area of the fiber elements introduced into the bitumen. The diameter does not take into account the specific surface area and therefore it does not correctly define the capacity of a given batch of fibers to be used as a reinforcement for the bitumen.

During the course of tests to perfect high performance reinforced bitumens, it has been found that there is one magnitude which could serve to judge the capacity of a fiber mat for fulfilling the role of a bitumen reinforcement: the micronaire. Measurement of the micronaire, also referred to as the "fineness index", takes into account specific surface area by measuring the loss of aerodynamic head when a given quantity of fibers extracted from a mat which is not lubricated is subject to a given pressure of a gas—generally air or nitrogen. This measurement is conventional in mineral fiber production units; it is standard (DIN 53941 or ASTM D 1448) and it uses a so-called "micronaire" appliance. The tests according to the invention are conducted with a Sheffield machine type FAM 60 P. This machine comprises an intake for air or nitrogen under pressure, a valve for regulating this pressure, a flow meter, a cylindrical chamber of vertical axis with inlets for gases at the bottom. The fibers weighed (more often than not 5 g±0.01 g) are pressed into the bottom of the chamber by a calibrated stopper which allows the gases to escape. A preliminary test makes it possible to adjust the rate of flow of air to a given value always the same prior to commencing the fiber buffer test. Measurement of the micronaire of the fineness index consists in recording the reading given by the standard flow meter when the fiber is in place. To work within the same range of losses of head, it is necessary to adapt the quantity of fibers tested by reducing the mass when the diameter diminishes. It is therefore necessary to mention this latter feature of reduced mass at the same time as the result of the rate of flow. The tests according to the invention have shown that a condition required in order to obtain a high performance bitumen is a micronaire of less than 7 for 5 grams.

This factor, the micronaire, makes it possible to monitor the extent to which a given batch of fibers is or is not suitable for bitumen reinforcement.

At the time of production of rock fibers or glass fibers, it is conventional to spray onto the fibers a liquid which makes it possible to coat them with a so-called size and which, according to its nature, makes it possible to adapt the fibers to the use for which they are intended.

With regard to reinforcement of the bitumens, in the prior art nothing is placed on the mineral fibers as a size (SE 211 163) or a cationic wetting agent (EP 55 233 or EP 58 290) is added to the fibers.

Certain other techniques envisage using, in order to coat gravel, with or without the addition of mineral fibers, bitumens to which are added adjuvants which are intended to favor engagement of the bitumen on the other elements of the final mixture. These adjuvants are either cationic wetting agents (DE-AS-17 19 350) or they are amines (U.S. Pat. No. 4,166,752 or FR-2 181 882). All of these lubricants or these adjuvants are therefore ionic compounds.

Within the framework of the invention, on the other hand, an aqueous solution of a non-ionic wetting agent is sprayed onto the rock fibers or onto the glass fibers intended for reinforcing the bitumen, just after their processing. Excellent results have been obtained with solutions of amine oxides such as dimethyl alkyl amine oxides and, in particular, the cases where the alkyl radical is a fatty acid radical. A preferred amine oxide is dimethyl stearyl amine oxide.

Once the fiber mat has been obtained with a good micronaire and with a suitable sizing, the step which remains is to make the fibers compatible with the conditions of use of the bitumen. This conditioning comprises the production of nodules and the way they are packaged.

Nodules are usually produced in two stages. In the first stage, the fiber mats are converted to flakes or flock which are/is converted to nodules in a second stage.

To produce the flock, a shredder is used which essentially comprises two parallel cylinders rotating in opposite directions and having fingers which, between the cylinders, intersect with each other without touching one another. At the outlet from the shredder, a pneumatic conveyor picks up the flock and carries it to a second apparatus which is shown in FIG. 1. This is a "nodulizer". It comprises an inlet pipe 1 and an outlet pipe 2. The upstream space 3 is separated from the downstream space 4 by a wall 5 of metal plate in which there are holes. The plate has the form of a cylinder which is coaxial with a rotary drum 6 carrying cutters 7 of which the cutting edge 8 is slightly inclined relative to their common axis. Facing the movable cutters 7 are fixed cutters 20 whose distance relative to the mobile cutters is adjustable. A distance of the order of a few millimeters, in particular 2 mm, is appropriate. The holes have a diameter of between 3 and 30 mm, preferably 6 to 15 mm according to the origin of the fibers and their micronaire. At the outlet from the nodulizer, the tube 2 is connected to a second pneumatic transport circuit by a slide valve which allows passage of the nodules without disturbing the air circuits. The final operation carried out at the mineral fiber production site is the preparation of the nodules which are either delivered into containers in bulk or they are packaged in bags of plastics film. In this case, polypropylene is preferably chosen.

The production of a coated gravel product according to the invention is carried out as follows and this is presented by way of example. First of all, 1600 kg of a mixture of calibrated gravel and filler (powder) are combined in a container. Prior to such introduction, the gravel is preheated to 160° C. Immediately thereafter, the fibrous nodules are introduced according to the invention (8 kg) into the mixture without removing them from the polypropylene bag. The liquid bitumen of type 60/70 (82 kg) is likewise at a temperature of 160° C. and is introduced into the container in turn. After being mixed for 2 minutes, the preparation is ready to be used for surfacing a roadway. By depositing 4 cm on an impermeable substrate, a layer of draining coating is obtained, the porosity of which is approx. 20% and it has a greater capacity for withstanding heat than do the conventional coating materials.

Figure 2:
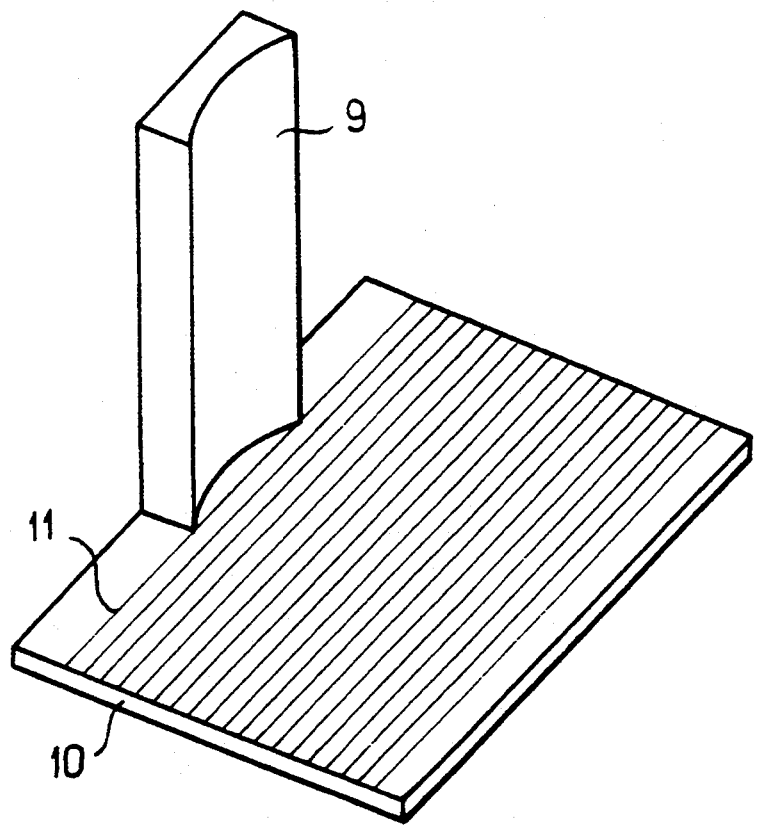
FIG. 2 is a DANIEL gauge.

To test the qualities of a bitumen mixture intended for coating gravel, several methods can be used. FIG. 2 diagrammatically shows the "DANIEL gauge". This apparatus comprises two elements which are at right-angles to each other, a chute 9 and a plate 10. The DANIEL test is carried out in two stages. In the first stage the chute 9 is horizontal and the plate 10 is vertical. The chute is filled with the hot mixture to be tested, the top surface is levelled and the mixture is allowed to stabilize at 40° C. for 16 hours. After this period, the chute is tilted vertically and one can see how the mixture spreads over the horizontal plate. This is engraved with parallel lines 11 which are equidistantly spaced at 3.175 mm. After 4 hours in an environment of 40° C., the position on the plate of the edge of bitumen which is most remote from the base of the chute is recorded. The number of gaps separating this edge from the base constitutes the result of the DANIEL gauge test. The higher the figure the less satisfactory will be the behavior of the product when it is exposed to temperature.

Another currently used test is the ball and ring test. This test is standardized (NF-T 66008, DIN 195 U4 or ASTM D 36-76). The principle is very simple. A steel ball of specific mass is placed on a sample of the product contained in a ring of metal and of standard dimensions. The whole assembly is heated with a constant rise in temperature of 5° C. per minute. The temperature at which the sample becomes fairly soft, so that the ball penetrates the bituminous product and becomes encased therein to a specific thickness, is taken as the softening point of the product being investigated. Thus, the test result is given in the form of a temperature and the higher the temperature the better is the behavior of the product when exposed to heat. It must however be pointed out that values in excess of 75° C. are given solely by way of indication and their relative position becomes uncertain in this zone.

Figure 3:
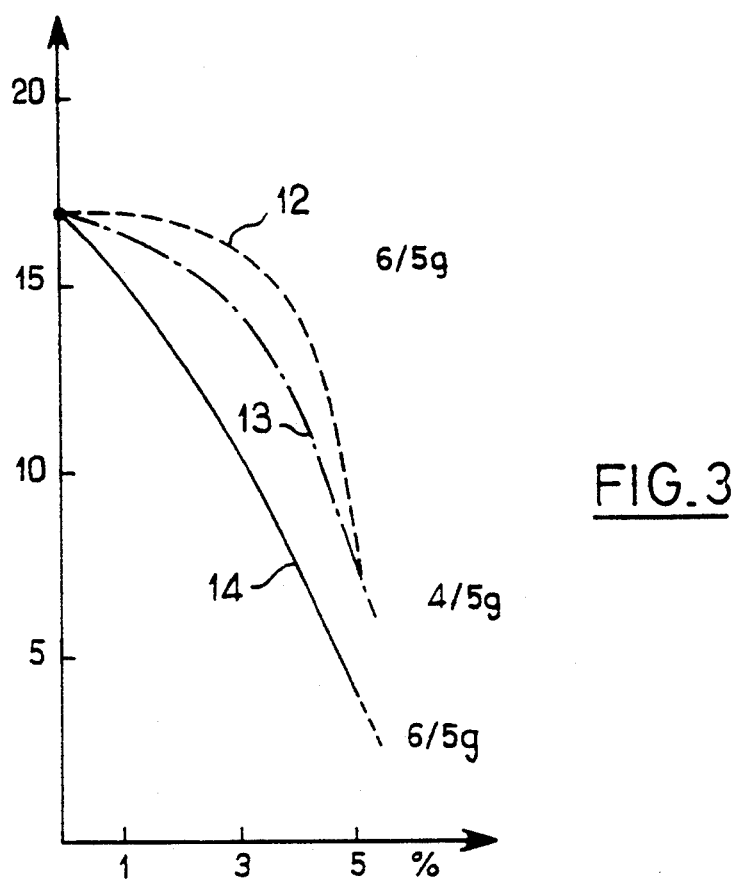
FIG. 3 shows comparative results of tests on the DANIEL gauge.

Results of the DANIEL gauge test are shown in FIG. 3. On the abscissa one can achieve the percentage by weight of fibers which constitute the only adjuvant introduced into the bitumen while the ordinates show the extent of flow obtained on the plate. The general trend is that the greater the quantity of a fiber of a given type, the less it flows in the mixture. Of the three curves 12, 13 and 14, curves 12 and 13 correspond to a fiber with a micronaire which is respectively 6 and 4, in both cases for 5 grams, this fiber having been sized with a quaternary amine in an aqueous solution (Lubromine NP).

On the other hand, curve 14 corresponds to a fiber having the same micronaire before sizing as that in curve 12 although its coating results from being treated by means of an aqueous solution of dimethyl stearyl amine oxide. It will be observed that the improvement provided by the treatment with this tension-active non-ionic agent depends on the quantity of fibers. It makes it possible to obtain an improvement amounting to several tens of percent.

Figure 4:
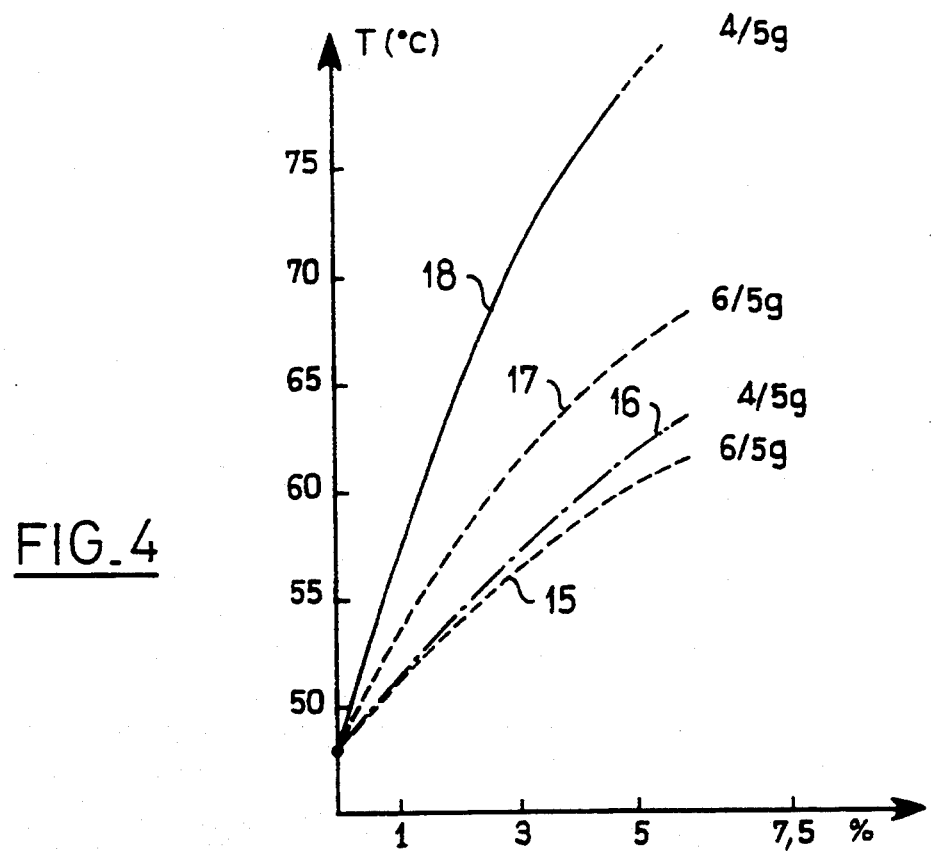
FIG. 4 shows results obtained from the ball and ring test.

FIG. 4 shows results of the ball and ring test. The abscissa represents the percentage by weight of mineral fiber fillers in the pure bitumen. The ordinates show the temperature of the mixture at which the ball passes through the bitumen. Graphs 15 and 16 correspond to a micronaire of 6 per 5 grams, while curves 16 and 18 have a value of 4, still with respect to 5 grams. All these curves for each percentage show values which are the arithmetical means of several experimental results. Here, the improvements are even more spectacular because at a concentration of 5% they achieve 6° C. for micronaire 6 and 17° C. for micronaire 4. As in the case of the DANIEL test, it can also be seen here that the treatment carried out on the fiber allows a micronaire of 6 to enjoy a better performance than a micronaire of 4.

The preceding tests were carried out with a nodulizer provided with a grid having openings 6 mm in diameter. Other tests were carried out at a constant micronaire (4 for 5 grams) with a stearyl dimethyl amine oxide-based size by varying the diameters of the circular holes in the grid. They are varied from 2 to 10 mm. In each case 5% of fibers was first mixed in a beaker with 2 liters of bitumen 50–70 at 150° C. by using a Raineri turbine. The operation is continued for 5 minutes. At the end of this time, the homogeneity of the mixture is observed using the eye, in the majority of cases it appears satisfactory. It is only for the diameter 10 mm that it was necessary to repeat the agitation for a second period of 5 minutes before obtaining a mixture having a homogeneous appearance. When mixing is completed, the ball-ring temperature measurement test is carried out. Concurrently, nodules of differing diameters, the same as those which have been used to make the mixtures tested for ball and ring temperature, have been observed with the scanning electron microscope. The length of all the fibers visible in the field of view was then measured and the average of these lengths was calculated, and also the proportion of fibers which have a length greater than 0.5 mm. The results are shown in the table:

| nodules (φ openings) mm | fibers length μm | %0–0.5 mm | Ball-and-ring temp. (°C.) |
| --- | --- | --- | --- |
| 2 | — | — | 57 |
| 4 | 105 | 96 | 61 |
| 6 | 255 | 85 | 65 |
| 8 | 330 | 78 | 78 |
| 10 | 490 | 65 | 81 |

Checks on the bitumen mixed under the preceding conditions have shown that the length of the fibers is only slightly modified by the "gentle" mixing operation carried out here. It is apparent from the preceding test that the method of preparation of the nodules proposed by the invention permits the length of the fibers to be controlled and protects them until they are introduced into the bitumen. It also shows the influence of this same length on the temperature behavior of the mixture, and the limit on the choice of greater lengths (larger nodules) resulting from mixing difficulties.

Having generally described this invention, a further understanding can be obtained by reference to certain specific examples which are provided herein for purposes of illustration only and are not intended to be limiting unless otherwise specified.

In the following examples, tests are presented which were carried out with micronaires (or mean diameters) which differed with sizes—ionic or non-ionic—which vary in different quantities and with modified nodules and varying proportions of fibers.

EXAMPLE 1

The fiber was a glass fiber centrifuged with a micronaire of 4 per 5 grams. The lubricating solution consisted of Lubromine NP dissolved in an equal quantity of water. The quantities sprayed on were such that the amount of size was 0.42% by weight in relation to the fiber. Drying was carried out while the fiber were being transferred to the conveyor belt.

The resultant fiber mat was then cut up and transported to the shredder downstream of which was the nodulizer equipped with a grid with holes 8 mm in diameter. The nodules were then collected at the outlet and mixed with bitumen in a proportion of 5% by weight.

The "ball and ring" test was then conducted and a temperature of 69.0° C. was found.

EXAMPLE 2

The conditions were the same as for Example 1, except that the lubricant consisted of a dimethyl stearyl amine oxide. This product was diluted at 50% in water and made it possible to obtain sizing at the rate of 0.48% of the weight of fibers. Introduced at the rate of 5% into a 60/70 bitumen, the fibers, prepared as nodules as in Example 1, make it possible to attain a temperature of 75.3° C. in the ball and ring test.

EXAMPLE 3

In this example, the conditions are exactly the same, including the nature of the size, as in Example 1. The difference is in the concentration of the Lubromine NP which here is 1 part to 2.30 parts water by volume producing a size percentage of 0.17% which produces a ball and ring temperature of 66.8° C.

EXAMPLE 4

This test is likewise conducted with the same fibers, the same micronaire, the same "nodulizing" technique (same diameter of holes in the grid) as previously. The same sizing as described in Example 2 was used which is dimethyl stearyl amine oxide diluted in water in a proportion of 1 part to 1.4 parts water. The sizing obtained is then 0.28% by weight. It makes it possible to attain a ball and ring temperature of 78.8° C.

EXAMPLES 5 AND 6

Examples 5 and 6 employ a thicker centrifuged glass fiber with a micronaire of 6 per 5 grams. In Example 5, the lubricant is Lubromine NP with a concentration in the water of the original liquid of 30% by volume and the resultant size level is 0.25% in relation to the weight of fibers. Thus, a ball and ring temperature of 59.6° C. is achieved. In Example 6, on the other hand, the size is based on the same amine oxide used previously; it is diluted in exactly the same way which supplies a lubricant proportion of 0.20%. Here the result was 63.0° C.

EXAMPLE 7

Example 7 uses the same fiber prepared in the same way as Example 6 except with regard to preparation of the nodules. Here, they are produced with a sheet metal plate in which there are holes (5, FIG. 1), the diameter of which is 10 mm. The result obtained is better than with the plate with the 6 mm holes since the temperature is 66.5° C.

EXAMPLE 8

This is identical to Example 7 except with regard to the nature and concentration of size. Here, a fatty amine oxide was also used but the fatty acid radical was that of laurylic acid. A 30% solution in water was then made up to obtain sizing at the rate of 0.17% by weight, which produced roughly the same result as before: 66.1° C.

EXAMPLE 9

Examples 9 and 10 use a fine fiber with a micronaire of 4 per 5 grams. The nodules are made with a sheet metal plate with 8 mm holes, but the quantity of fibers introduced into the bitumen in this case is 7.5% by weight. In Example 9, the size was dimethyl stearyl amine oxide diluted at 30% in water to provide sizing at the rate of 0.15% over the weight of fibers. Under these conditions, the result achieved was 77.1° C. for the ball and ring test.

EXAMPLE 10

All the conditions of preparation were identical to those in Example 9 except for the use of dimethyl lauryl amine oxide instead of dimethyl stearyl amine oxide. It is diluted at the rate of 30% in water providing a quantity of size of 0.14%. It use resulted in a ball and ring temperature of 80.3° C.

The foregoing examples show that the technique of the present invention, by offering a method of preparing mineral fibers intended for reinforcing a mixture of gravel in bitumen is different from the prior art techniques, both in terms of the initial quality of the fibers, i.e., fineness and length, and in terms of the nature of the lubricants and the use of nodules which, prepared under clearly defined conditions, make it possible to produce coatings, the properties of which are markedly improved in relation to those of other techniques. This makes it possible either to retain the same performance, while reducing the quantity of fibers to be added to the mixture, or to enjoy a substantial improvement in performance for one and the same cost.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of producing a bituminous mixture containing mineral wool fibers, comprising:
   preparing mineral wool at a micronaire of at most equal to 7 per 5 grams of mineral wool, passing a flock of said mineral wool fibers through a plate having holes from 3 to 30 mm average size, thereby forming mineral wool nodules, and mixing said mineral wool fiber nodules and bitumen to form said bituminous mixture.

2. The method according to claim 1 wherein the holes in the plate by which the nodules are formed have an average size of 6 mm to 15 mm.

3. The method according to claim 2, wherein the micronaire of the fibers prior to the treatment is 6 per 5 grams and wherein the holes in the plate which form the nodules are substantially circular and at 10 mm in diameter.

4. The method according to claim 2, wherein the micronaire of the fibers prior to treatment is 4 per 5 grams and wherein the holes in the plate through which the nodules are formed are substantially circular and 8 m in diameter.

5. The method according to claim 1 wherein the mineral wool fibers have a length of less than 500 μm.

* * * * *

UNITED STATES PATENT AND TRADEMARK OFFICE
CERTIFICATE OF CORRECTION

PATENT NO. : 5,431,727
DATED      : July 11, 1995
INVENTOR(S) : Gerard BASIN, et al.

It is certified that error appears in the above-identified patent and that said Letters Patent is hereby corrected as shown below:

On the title page, Item [22], the Filing Date should read:

--Apr. 6, 1994--

Signed and Sealed this

Ninth Day of June, 1998

Attest:

BRUCE LEHMAN

Attesting Officer        Commissioner of Patents and Trademarks